UNITED STATES PATENT OFFICE.

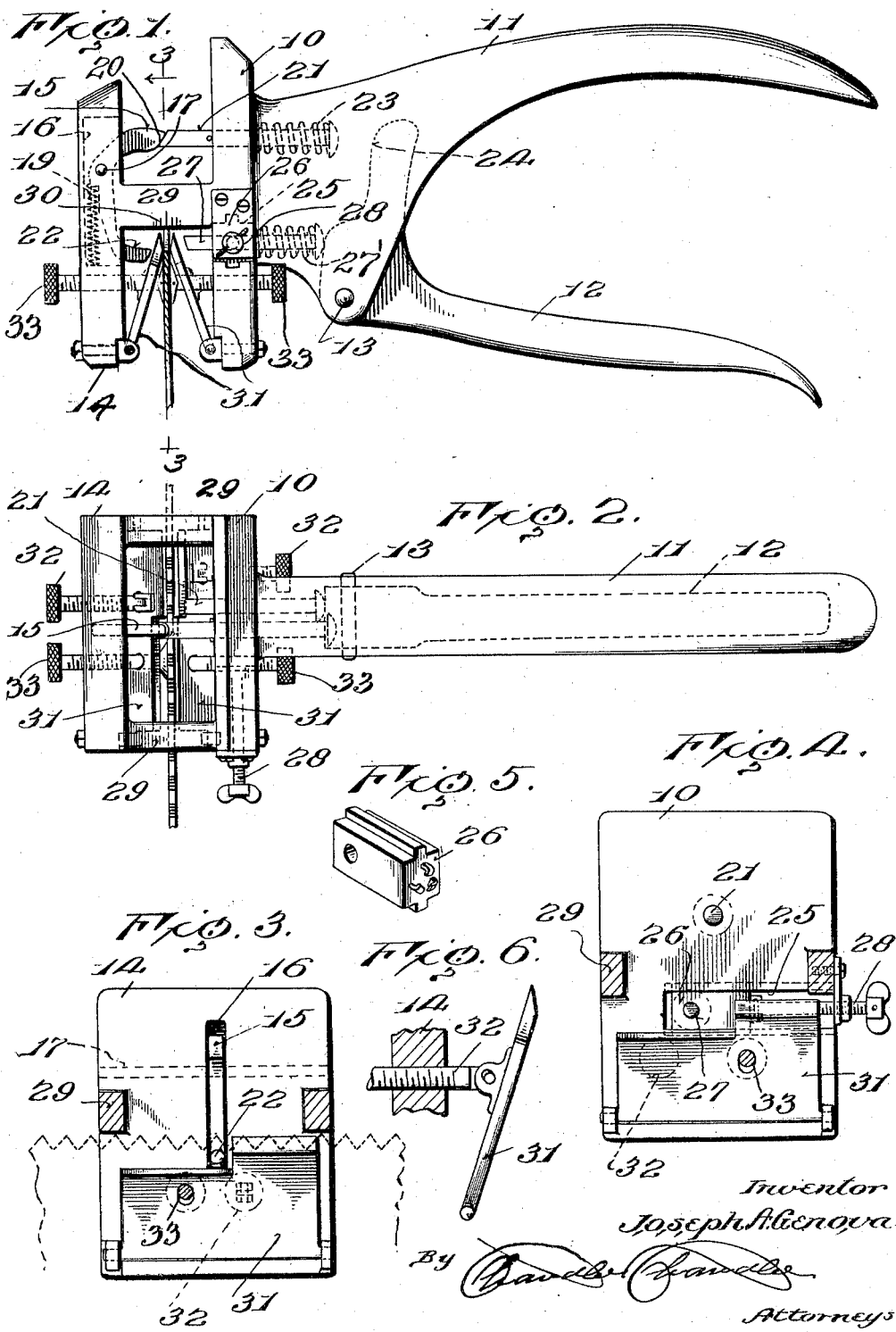

JOSEPH A. GENOVA, OF OYSTER BAY, NEW YORK.

SAW-SET.

1,315,222.

Specification of Letters Patent.   Patented Sept. 9, 1919.

Application filed February 21, 1919. Serial No. 278,535.

*To all whom it may concern:*

Be it known that I, JOSEPH A. GENOVA, a citizen of Italy, residing at Oyster Bay, in the county of Nassau, State of New York, have invented certain new and useful Improvements in Saw-Sets; and I do hereby declare the following to be a full, clear, and exact description of the invention, such as will enable others skilled in the art to which it appertains to make and use the same.

The invention relates to a saw set and more particularly to the class of hand operated saw setting tools.

The primary object of the invention is the provision of a tool of this character, wherein the teeth of a saw can be accurately set and in the use of the tool, two of the teeth are reversely set in a single operation of said tool thereby enabling the setting of the saw teeth with despatch and in an accurate and uniform manner.

Another object of the invention is the provision of a tool of this character, wherein the construction thereof is novel in form, so it can be readily adjusted to accommodate different sized saws, to set a plurality of the teeth in a single operation of the tool, the saw being clamped in the tool and properly centered therein for the accurate setting of the teeth.

A further object of the invention, is the provision of a tool of this character, wherein a single tooth or two or more teeth of the saw can be accurately set, the tool being adjusted for this purpose and capable of being readily and easily operated to effect the setting of the teeth without excessive labor on the part of the user of the tool.

A still further object of the invention is the provision of a tool of this character, which is extremely simple in construction, reliable, efficacious and inexpensive to manufacture.

With these and other objects in view, the invention consists in the features of construction, combination and arrangement of parts as will be hereinafter fully described, illustrated in the accompanying drawing and pointed out in the claims hereunto appended.

In the accompanying drawing:

Figure 1, is a side elevation of a tool constructed in accordance with the invention.

Fig. 2, is a top plan view thereof.

Fig. 3, is a fragmentary vertical transverse sectional view through the tool, taken on the line 3—3 of Fig. 1.

Fig. 4, is a similar view looking in the opposite direction.

Fig. 5, is a perspective view of a movable slide or block employed with the device, and Fig. 6, is a detailed fragmentary longitudinal sectional view showing the manner of mounting the clamping plates.

Similar reference characters indicate corresponding parts throughout the several views in the drawing.

Referring to the drawing in detail, the saw setting tool comprises, a main body 10, preferably in the form of a rectangular plate constituting one cheek of the tool and has integrally formed at right angles thereto centrally of one face, a stationary handle 11, the gripping end portion of which is upwardly bowed. Pivoted to this end is a movable operating handle 12, the pivot 13 thereof being mounted in opposed side extensions of the handle 11. Arranged spaced from the plate 10 in parallel relation thereto is a companion or the other cheek plate 14, and between these plates is adapted to be clamped the saw for the setting of its teeth as shown, and in a manner presently described.

Pivotedly supported in the companion cheek plate 14, is a vertical substantial V-shaped locking trigger 15, the plate 14 being formed with a slot or recess 16 for accommodating said trigger 15, which is supported upon a pivot 17 extending transversely of the slot or recess 16 and engaged in the plate 14. Working against the trigger 15 and seated on a shoulder formed thereon, is a coiled spring 19, which is also seated in the slot 16 and serves to normally hold the trigger in an inoperative position. The uppermost arm or limb of the trigger 15 is formed with a beveled engaging end 20, which is in the path of movement of the plunger 21, slidably mounted transversely in the cheek plate 10 and acted upon by the inner end of the handle 12 so as to rock the trigger 15 which is formed on the end of the other arm or limb with a beveled tooth setting jaw 22 adapted to engage and bend a single tooth of the saw on actuating the operating handle 12. The plunger is surrounded by an expansible coiled resetting spring 23 which acts upon the handle 12 to partly return the same to normal position, the inner end of the handle 12 being formed with a cam edge 24 for displacing the plunger 21 to operate the trigger, as will be obvious.

Below the plunger 21, in the cheek plate 10, is formed a transverse guide slot 25, in which is mounted a movable slide or block 26 supporting a tooth setting plunger 27 having a beveled inner end or jaw and movably mounted therein and arranged in the path of movement of extended portion at the inner end of the handle 12, nearest the pivot 13 thereof, so as to be actuated thereby for the setting of another tooth of the saw reversely to the setting of the tooth by the jaw 22, so that when manipulating the operating handle 12, two teeth of the saw can be set simultaneously.

When it is desired to set two teeth, the plunger 27 is positioned to be operated upon by the handle 12 and likewise the jaw 22 is actuated by said handle, said jaws operating in opposite directions to dispose the teeth at opposite angles.

Mounted in the plate 10 and acting upon the slide or block 26 is an adjusting screw 28 for the adjustment of the plunger 27 bodily along the saw blade, to position the same relative to the saw tooth to be acted upon thereby, the plunger 27 being acted upon by a spring 27' corresponding to the spring 23. In this connection, it will be noted that the saw blade can be initially positioned to dispose one tooth thereof opposite to the jaw 22, and the jaw 27 afterward adjusted through the medium of the block 26 and the adjusting screw 28.

The plates 10 and 14 are joined with each other in their spaced relation through the medium of cross connecting webs 29 which have suitable gage scales 30 marked or otherwise indicated thereon so as to determine the angular setting of the teeth of the saw.

Pivotally supported on the plates 10 and 14 and located between the same are swinging clamping plates or blades 31 which grip the opposite faces of the saw blade when inserted therebetween, and the free edges of these plates 31 determine the extent of the angular bend of the teeth of the saw as said edges aline with the crests of the crotches between the teeth. Mounted in the plates 10 and 11 and acting upon the plates 31 are adjusting screws 32 which enable the said plates 31 to be brought into clamping engagement with the saw and also for centering the same in the tool. The saw is also adapted to be held by clamping screws 33.

In the use of the tool, the saw is inserted between the plates 31 and clamped thereby centrally of the tool which on operation of the handle 12 the jaw 22 and jaw of the plunger 27 will be operated for the setting of two teeth of the saw in one operation of the tool, and as has been stated a single tooth can be set by the tool by omitting one of the jaws. On adjustment of the plunger 27 it can be regulated relative to the position of the tooth to be set thereby and it will also be understood that when the handles are released of compression the said handles will separate under the action of the springs 19, 23 and 27' previously described.

From the foregoing it is thought that the construction and manner of operation of the tool will be clearly understood, therefore a more extended explanation has been omitted.

What is claimed is:—

1. In a saw set, spaced stationary plates, a trigger pivotally mounted in one of the plates and having a tooth setting jaw, a plunger mounted in the other plate and having a tooth setting jaw and means for simultaneously operating the plunger and trigger, for bending two teeth of a saw in a single operation.

2. A saw set comprising spaced plates having fixed relation, means for positioning a saw blade between the plates, a pair of oppositely operable tooth setting jaws movably connected with the plates, a lever pivotally connected with one of the plates and means operable by the pivoted lever in one direction of movement for simultaneously actuating the jaws in directions to engage teeth from opposite sides of a saw within the positioning means.

3. A saw set comprising spaced plates, means for clamping a saw between the plates, a trigger pivotally mounted in one of the plates and having a tooth setting jaw arranged to engage a saw tooth from one side when in the clamping means, a second tooth setting jaw movably mounted to engage an adjacent tooth from the opposite side of a saw in the clamping means and means for moving the jaws oppositely against the respective teeth.

4. In a saw set, spaced stationary plates, a trigger pivotally mounted in one of the plates and having a tooth setting jaw, a plunger mounted in the other plate, and having another tooth setting jaw at the inner end thereof, means for simultaneously operating the plunger and trigger, for bending two teeth of a saw in a single operation, means for clamping a saw between the plates, means for adjusting the last named jaw laterally relative to the first named jaw, and means for holding the trigger normally in inoperative position.

5. In a saw set, spaced stationary plates, a trigger pivotally mounted in one of the plates and having a tooth setting jaw, a stationary handle on one plate, a handle movable on said plate, a plunger operating through said plate to engage said trigger, a second plunger operating through said plate and having a tooth setting jaw, said movable handle being adapted to shift said plungers, to simultaneously operate said trigger for bending a plurality of teeth of a saw in a single operation, means for clamping a saw between the plates, means for adjusting the last named plunger laterally relative to the jaw of the trigger, and means for holding the trigger in normal inoperative position, said clamping means comprising hinged plates designed to engage the saw adjacent the teeth thereof.

In testimony whereof, I affix my signature, in the presence of two witnesses.

JOSEPH A. GENOVA.

Witnesses:
 ANGELO LUANGO,
 STANLEY V. SUMMERS.

Copies of this patent may be obtained for five cents each, by addressing the "Commissioner of Patents, Washington, D. C."